(12) United States Patent
Panagis et al.

(10) Patent No.: US 10,737,544 B2
(45) Date of Patent: Aug. 11, 2020

(54) SYSTEMS AND METHODS TO CONTROL A SUSPENSION OF A VEHICLE

(71) Applicant: Ford Global Technologies, LLC, Dearborn, MI (US)

(72) Inventors: Timothy Panagis, Ypsilanti, MI (US); Phil Lenius, Commerce Township, MI (US); Uwe Hoffmann, Leverkusen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 178 days.

(21) Appl. No.: 15/658,207

(22) Filed: Jul. 24, 2017

(65) Prior Publication Data
US 2019/0023094 A1 Jan. 24, 2019

(51) Int. Cl.
*B60G 17/0165* (2006.01)
*B60G 17/016* (2006.01)
(Continued)

(52) U.S. Cl.
CPC ....... *B60G 17/0161* (2013.01); *B60G 17/019* (2013.01); *B60G 17/0165* (2013.01);
(Continued)

(58) Field of Classification Search
CPC ............ B60G 17/0161; B60G 17/0182; B60G 17/019; B60G 17/0165; B60G 2400/204;
(Continued)

(56) References Cited

U.S. PATENT DOCUMENTS 4,804,203 A * 2/1989 Glab .................... B60G 17/019
280/5.514
8,918,253 B2 * 12/2014 Norton ................. B60G 17/018
701/37
(Continued)

FOREIGN PATENT DOCUMENTS

DE 102010044263 3/2012
JP H04342612 11/1992
(Continued)

OTHER PUBLICATIONS

An Experimental Investigation into the Design of Vehicle Fuzzy Active Suspension; Farong Kou ; Zongde Fang; 2007 IEEE International Conference on Automation and Logistics; pp. 959-963; IEEE Conferences; year 2007.*
(Continued)

*Primary Examiner* — Cuong H Nguyen
(74) *Attorney, Agent, or Firm* — Ray Coppielle; Hanley, Flight & Zimmerman, LLC

(57) ABSTRACT

Systems and methods to control suspension of a vehicle are disclosed. An example apparatus includes one or more processors coupled to a vehicle. The one or more processors are to generate road profile data while the vehicle is moving and generate suspension control data based on the road profile data. A suspension of the vehicle is to be adjusted based on the suspension control data. The one or more processors also determine a distance traveled by the vehicle during a time interval. The time interval is associated with generating the road profile data or adjusting the suspension. The one or more processors also adjust the suspension based on the suspension control data, the distance, and a preview distance associated with the vehicle.

20 Claims, 7 Drawing Sheets

(51) Int. Cl.
B60G 17/019 (2006.01)
B60G 17/018 (2006.01)

(52) U.S. Cl.
CPC .... B60G 17/0182 (2013.01); *B60G 2400/204* (2013.01); *B60G 2400/208* (2013.01); *B60G 2400/50* (2013.01); *B60G 2400/82* (2013.01); *B60G 2401/142* (2013.01); *B60G 2600/02* (2013.01)

(58) Field of Classification Search
CPC ............ B60G 2400/82; B60G 2600/02; B60G 2400/208; B60G 2400/50; B60G 2401/142; B60G 13/14; B60G 13/16; B60G 2400/821; B60G 2400/824; B60G 2401/16
USPC ............... 701/37, 38; 280/5.5; 348/143, 148
See application file for complete search history.

(56) References Cited

U.S. PATENT DOCUMENTS

| | | | | |
|---|---|---|---|---|
| 8,990,000 | B2* | 3/2015 | Rhode | B60G 17/0182 701/124 |
| 9,417,075 | B2 | 8/2016 | Knox et al. | |
| 9,533,539 | B2 | 1/2017 | Eng et al. | |
| 9,738,132 | B2* | 8/2017 | Norton | B60G 17/018 |
| 10,115,024 | B2* | 10/2018 | Stein | G06K 9/4604 |
| 10,173,489 | B2* | 1/2019 | Miska | B60G 17/0155 |
| 2004/0094912 | A1* | 5/2004 | Niwa | B60G 17/0165 280/5.518 |
| 2006/0243548 | A1* | 11/2006 | Stein | B60G 17/08 188/266.1 |
| 2009/0097038 | A1* | 4/2009 | Higgins-Luthman | B60G 17/019 356/602 |
| 2010/0042293 | A1* | 2/2010 | Moshchuk | B60G 17/08 701/37 |
| 2014/0039758 | A1* | 2/2014 | Schindler | B60G 17/0165 701/37 |
| 2014/0297116 | A1 | 10/2014 | Anderson et al. | |
| 2014/0303844 | A1* | 10/2014 | Hoffmann | B60G 17/0165 701/37 |
| 2015/0224845 | A1* | 8/2015 | Anderson | B60G 17/019 701/37 |
| 2015/0352920 | A1 | 12/2015 | Lakehal-Ayat et al. | |
| 2016/0253566 | A1* | 9/2016 | Stein | G06T 7/20 348/148 |
| 2017/0270372 | A1* | 9/2017 | Stein | B60W 10/20 |

FOREIGN PATENT DOCUMENTS

| | | |
|---|---|---|
| JP | 2009119947 | 6/2009 |
| KR | 20120051552 | 5/2012 |

OTHER PUBLICATIONS

Simulation study of MR damper for bump road profile; S. M. Khot ; Shradha Patil ; Nikhil A. Bhaye; 2017 International Conference on Nascent Technologies in Engineering (ICNTE); pp. 1-6; IEEE Conferences; year 2017.*

Application of gain scheduling to design of active suspensions; M.N. Tran ; D. Hrovat; Proceedings of 32nd IEEE Conference on Decision and Control; pp. 1030-1035 vol. 2; IEEE Conferences; year 1993.*

Simultaneous road profile estimation and anomaly detection with an input observer and a jump diffusion process estimator; Zhaojian Li et al.; 2016 American Control Conference (ACC); pp. 1693-1698; IEEE Conferences; year 2016.*

* cited by examiner

SYSTEMS AND METHODS TO CONTROL A SUSPENSION OF A VEHICLE

FIELD OF THE DISCLOSURE

This disclosure relates generally to vehicles and, more particularly, to systems and methods to control a suspension of a vehicle.

BACKGROUND

A vehicle typically has automated controllers operable to control various systems (e.g., an anti-lock braking system, an active suspension system, etc.) of the vehicle and improve performance during normal vehicle use. Such controllers may be communicatively coupled to sensors (e.g., cameras or optical sensors, tachometers, transducers, etc.) to periodically monitor and detect parameters and/or characteristics associated with the vehicle, such as speed, acceleration, fluid pressure, etc. Recently, conventional controllers have become more complex with advancements of more powerful processor architectures and incorporate more complex algorithms and programs that previously were not feasible.

In particular, a vehicle with an active or a semi-active suspension system may utilize a sensor (e.g., a camera or optical sensor) to capture images of a road surface while the vehicle is moving. An electronic control unit (ECU) can advantageously use data from the sensor to control the suspension system and forces that are transmitted to the vehicle chassis from the road surface, which can improve comfort for occupants during normal use of the vehicle.

SUMMARY

An example apparatus disclosed herein includes one or more processors coupled to a vehicle. The one or more processors are to generate road profile data while the vehicle is moving and generate suspension control data based on the road profile data. A suspension of the vehicle is to be adjusted based on the suspension control data. The one or more processors also determine a distance traveled by the vehicle during a time interval. The time interval is associated with generating the road profile data or adjusting the suspension. The one or more processors also adjust the suspension based on the suspension control data, the distance, and a preview distance associated with the vehicle.

Another example apparatus includes one or more processors coupled to a vehicle. The one or more processors are to generate road profile data corresponding to a road surface spaced by a distance relative to the vehicle and generate suspension control data based on the road profile data. A suspension of the vehicle is to be adjusted based on the suspension control data. The one or more processors also update the distance based on a time interval and vehicle speed data. The time interval is associated with generating the road profile data or adjusting the suspension. The one or more processors also adjust the suspension based on the suspension control data and the updated distance.

An example method disclosed herein includes generating road profile data while a vehicle is moving and generating suspension control data based on the road profile data. A suspension of the vehicle is to be adjusted based on the suspension control data. The method also includes determining a distance traveled by the vehicle during a time interval. The time interval is associated with generating the road profile data or adjusting the suspension. The method also includes adjusting the suspension based on the suspension control data, the distance, and a preview distance associated with the vehicle.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
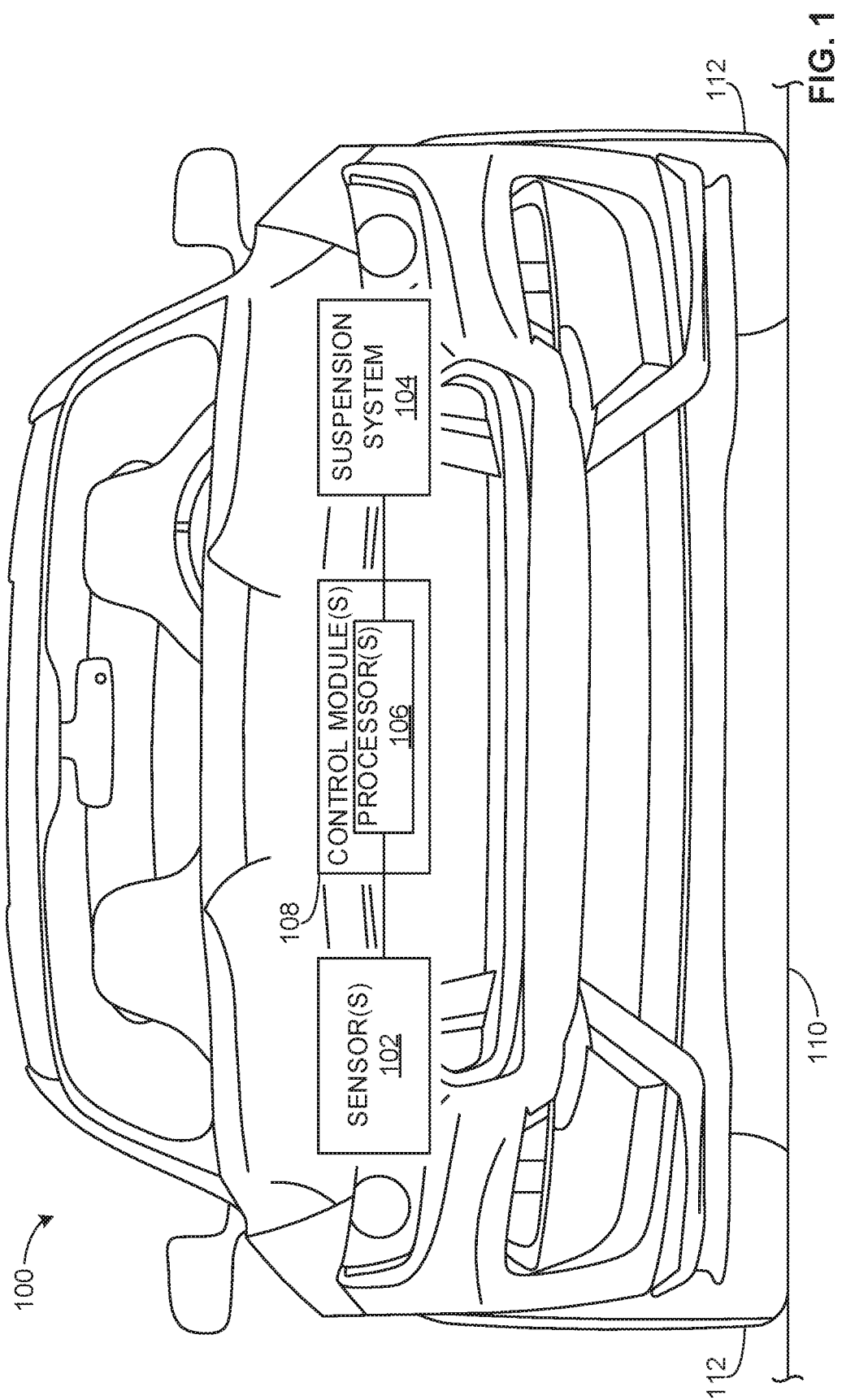
FIG. 1 is a schematic illustration of an example vehicle that may implement systems and methods in accordance with the teachings of this disclosure.

Systems and methods to control a suspension of a vehicle are disclosed. A vehicle having an active or a semi-active suspension system utilizes a suspension controller to improve ride performance and comfort for occupants of the vehicle. A conventional suspension controller typically includes one or more ECUs that are communicatively coupled to sensors (e.g., cameras or optical sensors, wheel speed sensors, etc.) of the vehicle. An ECU can process images and/or measurements provided via the sensors to detect undesired variations on a road surface in front of the vehicle, such as potholes, bumps, etc. Based on the speed of the vehicle and a distance of such variations relative to the vehicle, the ECU may control valves, actuators, motors, etc. of the suspension system to govern forces transmitted to the vehicle from the road surface, thereby compensating for vibrations or movements of the chassis that would have otherwise disturbed a driver and/or passenger(s).

To effectively compensate for such vibrations or movement, the suspension controller provides a control signal or current to the suspension system at specific times corresponding to when different wheel assemblies (e.g., left, right, front and/or rear wheel assemblies) of the vehicle contact the road surface variations. However, undesired latencies or time intervals (e.g., 50 milliseconds, 100 milliseconds, 200 milliseconds, etc.) are inherent to theses conventional suspension controllers, which may leave the ECU(s) without crucial data that is needed to effectively reduce the vibrations and/or movement of the chassis while the vehicle is moving.

For example, such latencies or time intervals are associated with measuring the road surface, processing associated data, and/or transmitting the data within a conventional suspension controller. In particular, the vehicle travels a certain distance during each of these time intervals. The above described known suspension controllers fail to effectively compensate for such time intervals and/or the distance(s) traveled by the vehicle and, as a result, fail to eliminate such undesired vibrations, movement and/or disturbances (or even worse, deliver on-time force requests, degrading the customer perception of ride).

Examples disclosed herein determine one or more time intervals associated with controlling a suspension system (e.g., an active and/or a semi-active suspension system) of a vehicle. Additionally or alternatively, some disclosed examples determine a distance traveled by the vehicle during each of the one or more of the time intervals. Examples disclosed herein adjust a suspension of the vehicle based on a parameter (e.g., a height, etc.) of a road surface in addition to the one or more time intervals and/or the distance(s), thereby reducing and/or eliminating vibrations and/or movement of the chassis and disturbances that would have otherwise been experienced by occupants of the vehicle.

Some disclosed examples provide one or more processors communicatively coupled to a vehicle. The processor(s) generate road profile data while the vehicle is moving, which may indicate a parameter of a road surface. One or more sensors (e.g., cameras or optical sensors) are communicatively coupled to the processor(s) to measure the parameter of the road surface. In some examples, the parameter is spaced by a distance relative to the vehicle (i.e., a preview or nominal distance).

The processor(s) also generate suspension control data based on the road profile data, which enables the processor(s) to control means for controlling the suspension of the vehicle, such as a suspension damper (e.g., a magnetorheological damper), valve, actuator, motor, etc., that is operatively coupled to a suspension system of the vehicle and communicatively coupled to the processor(s).

In some disclosed examples, the processor(s) determine a time interval associated with the sensor(s) measuring the road surface. In other examples, the processor(s) determine a different time interval associated with generating the road profile data and/or the suspension control data. In other examples, the processor(s) determine a different time interval associated with adjusting the suspension of the vehicle.

In examples disclosed herein, the processors determine one or more of the above disclosed time intervals by comparing or otherwise processing different time data (e.g., time stamps generated by the processor(s) and/or behavior of the sensor(s)) that is generated and/or provided by measuring the road surface, generating the road profile data, generating the suspension control data and/or adjusting the suspension.

In some examples, first time data corresponds to a processor receiving a measured parameter of the road surface from a sensor and second time data corresponds to the processor generating (e.g., beginning generating, completing generating, etc.) the road profile data based on the measured parameter.

In some examples, third time data corresponds to a first processor generating the road profile data and fourth time data corresponds to a second processor receiving the road profile data from the first processor. In such examples, the first processor and the second processor execute instructions at the same rate (e.g., execute instructions simultaneously), which may enable the second processor to easily compare or otherwise process the third time data and the fourth time data.

Additionally or alternatively, the first processor transmits the road profile data to the second processor in response to a request for data from the second processor. In such examples, fifth time data corresponds to the second processor providing the request for data and sixth time data corresponds to the second processor receiving the road profile data in response.

In other examples, seventh time data corresponds to another processor requesting the suspension control data and the eighth time data corresponds to that processor receiving the suspension control data in response. In such examples, the second processor may transmit the suspension control data to a third processor in response to a request for data from the third processor.

Additionally or alternatively, the processor(s) determine a distance traveled by the vehicle during one or more of the time intervals. In some examples, the processor(s) determine the distance by repeatedly storing vehicle speed data (e.g., first vehicle speed data, second vehicle speed data, third vehicle speed data, etc.) in a database during a time interval (e.g., one or more of the time intervals disclosed above). In such examples, the processor(s) calculate the distance based on first vehicle speed data, second vehicle speed data, and time between the first vehicle speed data and the second vehicle speed data. In other examples, the processor(s) can advantageously use any suitable vehicle speed data associated with the processor(s) to calculate the distance, such as third vehicle speed data and time between the second vehicle speed data and the third vehicle speed data, etc. In some examples, the processor(s) update the preview distance using the calculated distance.

In examples disclosed herein, the processor(s) adjust the suspension of the vehicle based on the suspension control data in addition to the preview distance, one or more of the determined time intervals and/or the calculated distance.

As used herein, the terms "first," "second," "third," "fourth," etc. that correspond to the term "time data" are used for illustrative purposes and each of the terms can correspond to different time data in other examples. Additionally or alternatively, the terms "first," "second," "third," "fourth," etc. that correspond to the term "vehicle speed data" are used for illustrative purposes and each of the terms can correspond to different vehicle speed data in other examples.

As used herein, the term "parameter" refers to one or more of a height, a length or distance, an area, a geometry, etc. associated with a road surface.

As used herein, the term "preview distance" or "nominal distance" refers a distance at which a parameter of the road surface is spaced relative to the vehicle, which is disclosed in greater detail below in connection with FIG. 3A.

As used herein, the term "variation" refers to a pothole or recess, a bump or protrusion, a hill, a depression, a general slope or grade, etc. on a road surface and/or any other characteristic associated with the road surface and/or the parameter.

FIG. 1 is a schematic illustration of an example vehicle 100 in accordance with the teachings of this disclosure. According to the illustrated example, the vehicle 100 can be a truck, a car, a bus, etc. having one or more sensors 102 (e.g., cameras or optical sensors, wheel speed sensors, pressure sensors, etc.) and a suspension system (e.g., an active or a semi-active suspension system) 104. The vehicle 100 also includes one or more processors 106 communicatively coupled to the sensors 102 and the suspensions system 104. As will be disclosed in greater detail below in connection with FIG. 2, the one or more processors 106 process and/or analyze data from the one or more sensors 102 to control the suspension system 104 of the vehicle 100.

According to the illustrated example, the one or more processors 106 is/are resident within one or more ECUs or control modules (e.g., a brake control module, a suspension control module, etc.) 108 of the vehicle 100. In some examples, the one or more processors 106 can be external to the vehicle 100 and/or the control modules 108. For example, the one or more processors 106 wirelessly communicate (e.g., via radio-frequency, satellite, etc.) with the vehicle 100 and/or the one or more control modules 108.

According to the illustrated example, the one or more sensors 102 can be cameras or optical sensors operable to capture images and/or measure parameters of a road surface 110. For example, a camera measures (e.g., continuously or repeatedly) a height of the road surface 110 while the vehicle 100 is moving. In some examples, the one or more sensors 102 include a wheel speed sensor or tachometer to measure a speed of the vehicle 100.

In some examples, the height of the road surface 110 is spaced by a distance (i.e., a preview distance) relative to the vehicle 100. For example, a preview distance associated with the vehicle 100 depends on a position and/or an orientation of the one or more sensors 102, which is disclosed in greater detail below in connection with FIG. 3A.

In the illustrated example of FIG. 1, the one or more sensors 102 are coupled to and/or positioned on the vehicle 100 in any suitable location and/or manner to provide such measurements. In some examples, the one or more sensors 102 are positioned in front and/or on top of the vehicle 100 to measure a parameter of the road surface 110. In some examples, a sensor 102 is positioned on and/or adjacent a wheel assembly 112 of the vehicle 100 to measure the speed of the vehicle 100.

According to the illustrated example, the suspension system 104 can be an active suspension system or a semi-active suspension system having means for controlling the suspension of the vehicle 100. The means for controlling the suspension is communicatively and/or operatively coupled to the one or more processors 106. For example, the means for controlling the suspension includes one or more suspension dampers (e.g., magnetorheological dampers) that respond to a control signal and/or a current provided by the one or more processors 106. In such examples, a damping or biasing characteristic of the suspension damper(s) varies based on the control signal or current, thereby controlling the suspension of the vehicle 100. Additionally or alternatively, the means for controlling the suspension includes valves, actuators, motors, etc., capable of controlling the suspension based on the control signal and/or the current from the one or more processors 106.

For illustrative purposes and clarity, the means for controlling the suspension will be referred to hereinafter as a "suspension damper," although one or more of the other examples disclosed above may additionally or alternatively be used in accordance with the teachings of this disclosure.

Figure 2:
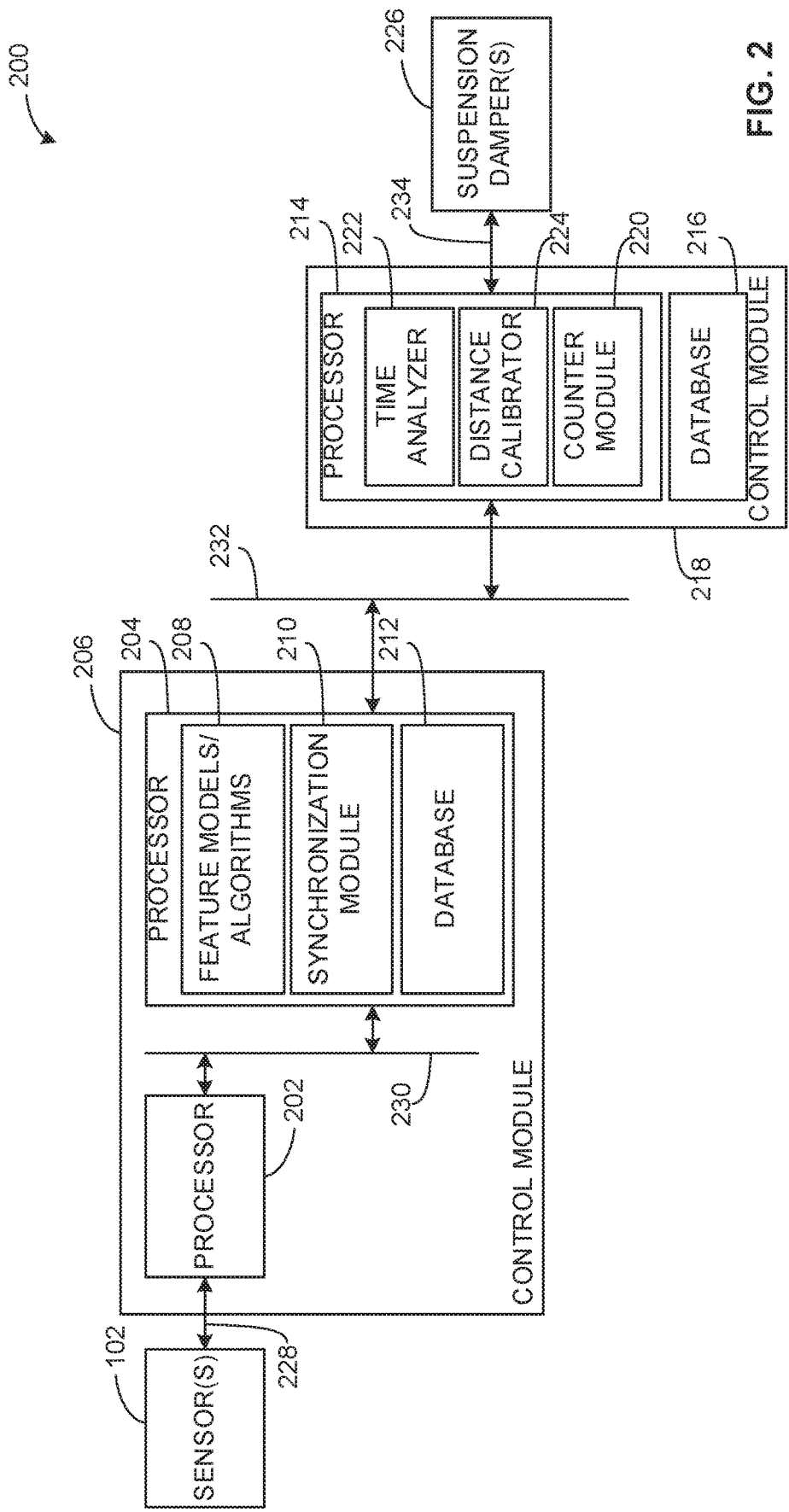
FIG. 2 is a block diagram of an example suspension control system in accordance with the teachings of this disclosure.

FIG. 2 is a block diagram of an example suspension control system 200 in accordance with the teachings of this disclosure. The suspension control system 200 (e.g., an apparatus) of the illustrated example may be used to implement the one or more example processors 106, the one or more example control modules 108, the example suspension system 104 (e.g., the means for controlling the suspension) and/or the example vehicle 100 of FIG. 1. The suspension control system 200 includes a first processor 202 and a second processor 204, which are resident in a first control module 206 in this example. According to the illustrated example, the suspension control system 200 includes feature models/algorithms 208, a synchronization module 210, and a first database 212, which are resident in the second processor 204 in this example.

The suspension control system 200 also includes a third processor 214 and a second database 216, which are resident in a second control module 218 in this example. According to the illustrated example, the suspension control system 200 also includes a counter module 220, a time analyzer 222, and a distance calibrator 224, which are resident in the third processor 214 in this example. Additionally or alternatively, the suspension control system 200 also includes the one or more sensors 102 and/or one or more suspension dampers (and/or other means for controlling the suspension) 226 associated with the suspension system 104 of FIG. 1.

While an example manner of implementing the one or more processors 106, the one or more control modules 108, the example suspension system 104 and/or the example vehicle 100 of FIG. 1 is illustrated in FIG. 2, one or more of the elements, processes and/or devices illustrated in FIG. 2 may be combined, divided, re-arranged, omitted, eliminated and/or implemented in any other way. Further, the example first processor 202, the example second processor 204, the example first control module 206, the example feature models/algorithms 208, the example synchronization module 210, the example first database 212, the example third processor 214, the example second database 216, the example second control module 218, the example counter module 220, the example time analyzer 222, the example distance calibrator 224 and/or, more generally, the example suspension control system 200 of FIG. 2 may be implemented by hardware, software, firmware and/or any combination of hardware, software and/or firmware. Thus, for example, any of the example first processor 202, the example second processor 204, the example first control module 206, the example feature models/algorithms 208, the example synchronization module 210, the example first database 212, the example third processor 214, the example second database 216, the example second control module 218, the example counter module 220, the example time analyzer 222, the example distance calibrator 224 and/or, more generally, the example suspension control system 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first processor 202, the example second processor 204, the example first control module 206, the example feature models/algorithms 208, the example synchronization module 210, the example first database 212, the example third processor 214, the example second database 216, the example second control module 218, the example counter module 220, the example time analyzer 222, the example distance calibrator 224, more generally, the example suspension control system 200 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example first processor 202, the example second processor 204, the example first control module 206, the example feature models/algorithms 208, the example synchronization module 210, the example first database 212, the example third processor 214, the example second database 216, the example second control module 218, the example counter module 220, the example time analyzer 222, the example distance calibrator 224 and/or, more generally, the example suspension control system 200 of FIG. 2 may include one or more elements, processes and/or devices in addition to, or instead of, those illustrated in FIG. 2, and/or may include more than one of any or all of the illustrated elements, processes and devices.

According to the illustrated example, the first processor 202 is communicatively coupled to the one or more sensors 102. In particular, the one or more sensors 102 measure a parameter of the road surface 110 and transmit the measurement to the first processor 202 via communication link(s) 228 such as, for example, signal transmission wires or busses, radio frequency, etc. In some examples, the parameter is spaced by a distance (i.e., the preview distance) relative to the vehicle 100, which is programmed into the first processor 202 and/or otherwise known to the suspension control system 200. For example, the parameter is positioned in front of the vehicle 100. This distance or preview distance can depend on an orientation and/or a position of the one or more sensors 102 relative to the vehicle 100, which is disclosed in greater detail below in connection with FIG. 3A.

The first processor 202 of the illustrated example generates road profile data based on the parameter of the road surface 110, which enables the second processor 204 to determine how to control the suspension system 104 via suspension control data. According to the illustrated example, the first processor 202 uses any suitable equation(s), algorithm(s), method(s) and/or technique(s) relating determining a profile of the road surface 110 and/or generating the road profile data.

In some examples, the first processor 202 also generates time data (e.g., time stamps) that is advantageously used by the suspension control system 200. For example, a time stamp is generated when the first processor 202 executes instructions (e.g., every 25 milliseconds, etc.) and/or receives the measurement from the one or more sensors 102. Continuing with this example, the first processor 202 provides different time stamps corresponding to when the road profile data is beginning to generate, partially generated and/or completely generated, respectively.

According to the illustrated example, the second processor 204 can also generate time data, which may be advantageously used by the suspension control system 200. For example, a time stamp is generated when the second processor 204 executes instructions and/or road profile data is received from the first processor 202. In some examples, the first processor 202 and the second processor 204 execute instructions at the same rate (e.g., execute instructions simultaneously) or different rates.

In this example, the second processor 204 is communicatively coupled to the first processor 202. In particular, the first processor 202 transmits the road profile data and/or associated data (e.g., time stamp(s), the preview distance (e.g., an initial and/or an updated preview distance), calculated distance(s) traveled by the vehicle 100, vehicle speed data, etc.) to the second processor 204 via communication link(s) 230 such as, for example, a serial peripheral interface (SPI) bus and/or any other suitable transmission control protocol (TCP).

In some examples, the second processor 204 includes the synchronization module 210. According to the illustrated example, the second processor 204 uses the synchronization module 210 to continuously or repeatedly provide a request for data to the first processor 202. This request includes time data corresponding to when the request was generated and/or transmitted using the communication link(s) 230. In such examples, the first processor 202 transmits the road profile data and/or the associated data in response to the request for data. When the second processor 204 receives the road profile data and/or the associated data, the second processor 204 generates a different time stamp.

According to the illustrated example, the second processor 204 uses the feature models/algorithms 208 to compare and/or otherwise process different time data to determine one or more time intervals that are advantageously used by the suspension control system 200 to control the suspension system 104 of the vehicle 100. For example, first time data corresponds to the first processor 202 receiving a measurement from the one or more sensors 102 and second time data corresponds to the second processor 204 receiving the road profile data from the first processor 202. In such examples, the first processor 202 and the second processor 204 execute instructions at the same rate, which enables the second processor 204 to easily compare the different time data, for example, without requiring the second processor 204 to translate the time reference frame of the first processor 202.

In other examples, third time data corresponds to the synchronization module 210 providing the request for data to the first processor 202 and fourth time data corresponds to the second processor 204 receiving the road profile data and/or the associated data in response to the request. More generally, the second processor 204 uses the feature models/algorithms 208 to compare and/or otherwise process any other suitable time data associated with the suspension control system 200 to determine the one or more time intervals.

In some examples, a time interval is associated with the one or more sensors 102 measuring the parameter of the road surface 110, which is disclosed in greater detail below in connection with FIG. 3B. In such examples, the second processor 204 uses the feature models/algorithms 208 to determine the time interval based on behavior of the one or more sensors 102. For example, the one or more sensors 102 includes a camera or optical sensor that provides measurements repeatedly, periodically and/or aperiodically (e.g., between 0 milliseconds and 55 milliseconds), which is inherent to a particular hardware, software and/or manufacturer of the camera or optical sensor. In such examples, the second processor 204 uses the feature models/algorithms 208 to determine the time interval based on such behavior such as, for example, by using a mean or average value of time between measurements and/or any other suitable statistic or numerical characteristic relating to the time between measurements.

According to the illustrated example, the second processor 204 uses the feature models/algorithms 208 to generate suspension control data based on the road profile data, which enables the third processor 214 to control the one or more suspension dampers 226. For example, the feature models/algorithms 208 include any suitable equation(s), algorithm(s), method(s) and/or technique(s) relating to one or more parameters of the road surface 110 and/or controlling the suspension system 104 of the vehicle 100.

In some examples, the second processor 204 uses the feature models/algorithms 208 to store a speed of the vehicle 100 in the first database 212 as data (i.e., vehicle speed data). For example, the second processor 204 receives the speed from the one or more control modules 108 of the vehicle 100 via the communication link(s) 232 (e.g., a control area network (CAN) bus and/or any other suitable TCP). The feature models/algorithms 208 are used to repeatedly store the speed based on the second processor 204 executing instructions. In some examples, the one or more sensors 102 include a wheel speed sensor or tachometer to measure the speed and transmit the speed to the feature models/algorithms 208 and/or the first database 212 via one or more of the communication links 228, 230, 232.

The second processor 204 also uses the feature models/algorithms 208 to determine a distance traveled by the vehicle 100. In particular, the feature models/algorithms 208 advantageously utilize the speed of the vehicle 100 and a time interval (e.g., provided by the second processor 204 and/or the feature models/algorithms 208) to calculate the distance. Additionally or alternatively, the feature models/algorithms 208 update the preview distance based on the calculated distance.

For example, the speed of the vehicle 100 is repeatedly stored in the first database 212, as disclosed above. The feature models/algorithms 208 determine first vehicle speed data, second vehicle speed data, third vehicle speed data, etc. and a time between each vehicle speed data based on the second processor 204 executing instructions. In some examples, the feature models/algorithms 208 then calculate the distance based on the first vehicle speed data, the second vehicle speed data, and time between the first vehicle speed data and the second vehicle speed data. In other examples, the feature models/algorithms 208 use any suitable of vehicle speed data and time between the vehicle speed data to calculate the distance. For example, the feature models/algorithms 208 calculates the distance based on: third vehicle speed data and time between the second vehicle speed data and the third vehicle speed data; fourth vehicle speed data and time between the third vehicle speed data and the fourth vehicle speed data; etc.

According to the illustrated example, the first database 212 stores and/or provides access to data associated with the vehicle 100 and/or the suspension control system 200. For example, as the one or more sensors 102 measure a speed of the vehicle 100, the first database 212 receives and stores (e.g., via one or more of the communication link(s) 228, 230, 232 and/or the second processor 204) the speed. Additionally or alternatively, the first database 212 receives one or more respective timestamps associated with when the speed was stored such as, for example, provided by the second processor 204 executing instructions.

According to the illustrated example, the third processor 214 is communicatively coupled to the second processor 204. In particular, the second processor 204 transmits the suspension control data and/or the associated data to the third processor 214 via the communication link(s) 232. The third processor 214 is also communicatively and/or operatively coupled to the one or more suspension dampers 226 via communication link(s) 234 (e.g., signal transmission wires or busses, radio frequency, etc.), thereby controlling the suspension damper(s) 226 based on the suspension control data, the preview distance, and/or the distance traveled by the vehicle 100.

In some examples, the third processor 214 stores the speed of the vehicle 100 in the second database 216 as data. For example, the third processor 214 receives the speed from the one or more control modules 108 of the vehicle 100 via the communication link(s) 232. In this example, the speed is repeatedly stored in the second database 216 based on the third processor 214 executing instructions.

According to the illustrated example, the second database 216 stores and/or provides access to data associated with the vehicle 100 and/or the suspension control system 200. For example, as the one or more sensors 102 measure a speed of the vehicle 100, the second database 216 receives and stores (e.g., via one or more of the communication link(s) 228, 230, 232 and/or the third processor 214) the speed. Additionally or alternatively, the second database 216 receives one or more respective timestamps associated with when the speed was stored such as, for example, provided by the third processor 214 executing instructions.

In some examples, the third processor 214 generates time data, which may be advantageously used by the suspension control system 200. For example, time stamps are generated when the third processor 214 executes instructions and/or receives the suspension control data from the second processor 204.

According to the illustrated example, the third processor 214 uses the counter module 220 to continuously or repeatedly request data (e.g., every 20 milliseconds, etc.) from the second processor 204 via the communication link(s) 232. The counter module 220 provides time data to the second processor 204 along with the request. In this example, the time data corresponds to when the counter module 220 generated and/or transmitted the request using the communication link(s) 232. In response to the second processor 204 receiving the request for data, the second processor 204 transmits the suspension control data and/or other associated data to the third processor 214 via the communication link(s) 232. When the third processor 214 receives the suspension control data, the third processor 214 generates a different time stamp.

According to the illustrated example, the third processor 214 uses the time analyzer 222 to compare and/or otherwise process different time data to determine one or more time intervals that are advantageously used by the suspension control system 200. In some examples, first time data corresponds to the third processor 214 generating and/or providing the request for data to the second processor 204 and second time data corresponds to the third processor 214 receiving the suspension control data from the second processor 204 in response. In other examples, the third processor 214 uses the time analyzer 222 to compare and/or otherwise process any other suitable time data associated with the suspension control system 200 to determine the one or more time intervals.

According to the illustrated example, the third processor 214 uses the distance calibrator 224 to determine another distance traveled by the vehicle 100. In particular, the distance calibrator 224 advantageously utilizes the speed of the vehicle 100 and a time interval (e.g., provided by the third processor 214 and/or the time analyzer 222) to calculate the distance. Additionally or alternatively, the distance calibrator 224 updates the preview distance based on the calculated distance.

For example, the speed of the vehicle 100 is repeatedly stored in the second database 216, as disclosed above. The distance calibrator 224 determines first vehicle speed data, second vehicle speed data, third vehicle speed data, etc. and time between the vehicle speed data based on the third processor 214 executing instructions during the time interval. The distance calibrator 224 then calculates the distance based on the first vehicle speed data, the second vehicle speed data, and time between the first vehicle speed data and the second vehicle speed data. In other examples, the distance calibrator 224 uses any suitable of vehicle speed data and time between the vehicle speed data to calculate the distance. For example, the feature models/algorithms 208 calculates the distance based on: third vehicle speed data and time between the second vehicle speed data and the third vehicle speed data; fourth vehicle speed data and time between the third vehicle speed data and the fourth vehicle speed data; etc.

As mentioned above, the third processor 214 controls the suspension damper(s) 226 based on the suspension control data, the preview distance and/or the distance traveled by the vehicle 100. In particular, the third processor 214 controls the damper(s) 226 such that they adjust the suspension of the vehicle 100 when the parameter of the road surface 110 contacts each of the wheel assemblies 112.

Figure 3:
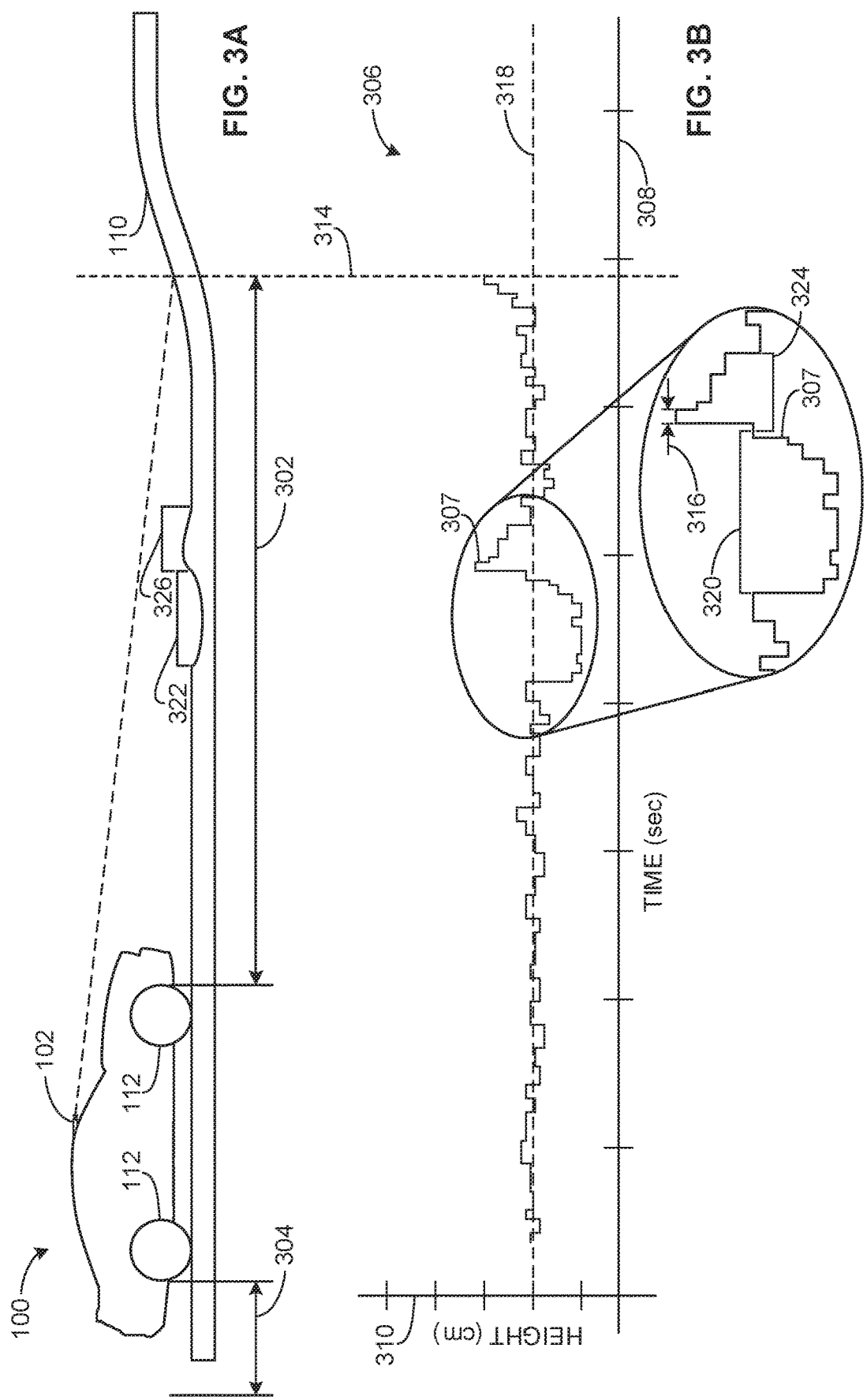
FIG. 3A shows a side view of the example vehicle of FIG. 1 on an example driving surface.
FIG. 3B shows an example graph representing data associated with the example vehicle of FIG. 1.

FIG. 3A shows a side view of the example vehicle 100 of FIG. 1 on an example driving surface during, such as the road surface 110 of FIG. 1 and/or any other suitable surface on which the vehicle 100 can be used. According to the illustrated example, the one or more sensors 102 capture images and/or measure a parameter of the road surface 110 such as, for example, a height of the road surface 110. The parameter may indicate a pothole or recess, a bump or protrusion, a hill, a depression, a general slope or grade, etc. on the road surface 110. In this example, the parameter is spaced by a distance 302 (i.e., the preview distance) relative to the wheel assemblies 112 and/or the vehicle 100.

In some examples, the one or more sensors 102 require time to measure the road surface 110 and, as a result, the vehicle 100 travels a certain distance 304 during an associated time interval. In other examples, the vehicle 100 travels a different distance 304 during the one or more other time intervals disclosed above.

FIG. 3B shows an example graph 306 representing example road profile data generated by the suspension control system 200, which is illustrated by an example plot 307. In this example, the graph 306 includes a horizontal axis 308 that represents time data (e.g., as seconds) and a vertical axis 310 that represents the height (e.g., as centimeters) of the road surface 110.

According to the illustrated example, the plot 307 represents the height of the road surface 110 relative to time. A dotted/dashed line 314 shown in FIGS. 3A and 3B indicates a latest measurement of the one or more sensors 102. Thus, a portion of the plot 307 to the left (in the orientation of FIG. 3B) of the dotted/dashed line 314 represents past measurements.

In this example, the one or more sensors 102 provide a time interval 316 between measurements, which may be characterized by inherent behavior of the one or more sensors 102, as disclosed above in connection with FIG. 2. For example, the one or more sensors 102 include a camera or optical sensor that measures the road surface 110 repeatedly, periodically and/or aperiodically (e.g., between 0 milliseconds and 55 milliseconds), which may be inherent to particular hardware, software and/or manufacturer of the camera or optical sensor.

In this example, the graph 306 includes a threshold value 318. According to the illustrated example, when a portion 320 of the plot 307 is below (in the orientation of FIG. 3B) the threshold value 318, a corresponding portion 322 of the road surface 110 may include an undesired variation, which may cause a chassis of the vehicle 100 to vibrate and/or move when one or more of the wheel assemblies 112 contact or otherwise encounter the portion 322.

Similarly, when a portion 324 of the plot 307 is above (in the orientation of FIG. 3B) the threshold value 318, a corresponding portion 326 of the road surface 110 may include another undesired variation, which may cause the chassis to vibrate and/or move when one or more of the wheel assemblies 112 contact or otherwise encounter that portion 326.

According to the illustrated example, any characteristics of the example graph 306 may be utilized by the examples disclosed herein to characterize one or more undesired variations on the road surface 110. Further, any appropriate graph characteristics, mathematical relationships and/or plot shape characteristics may be used.

Figure 4:
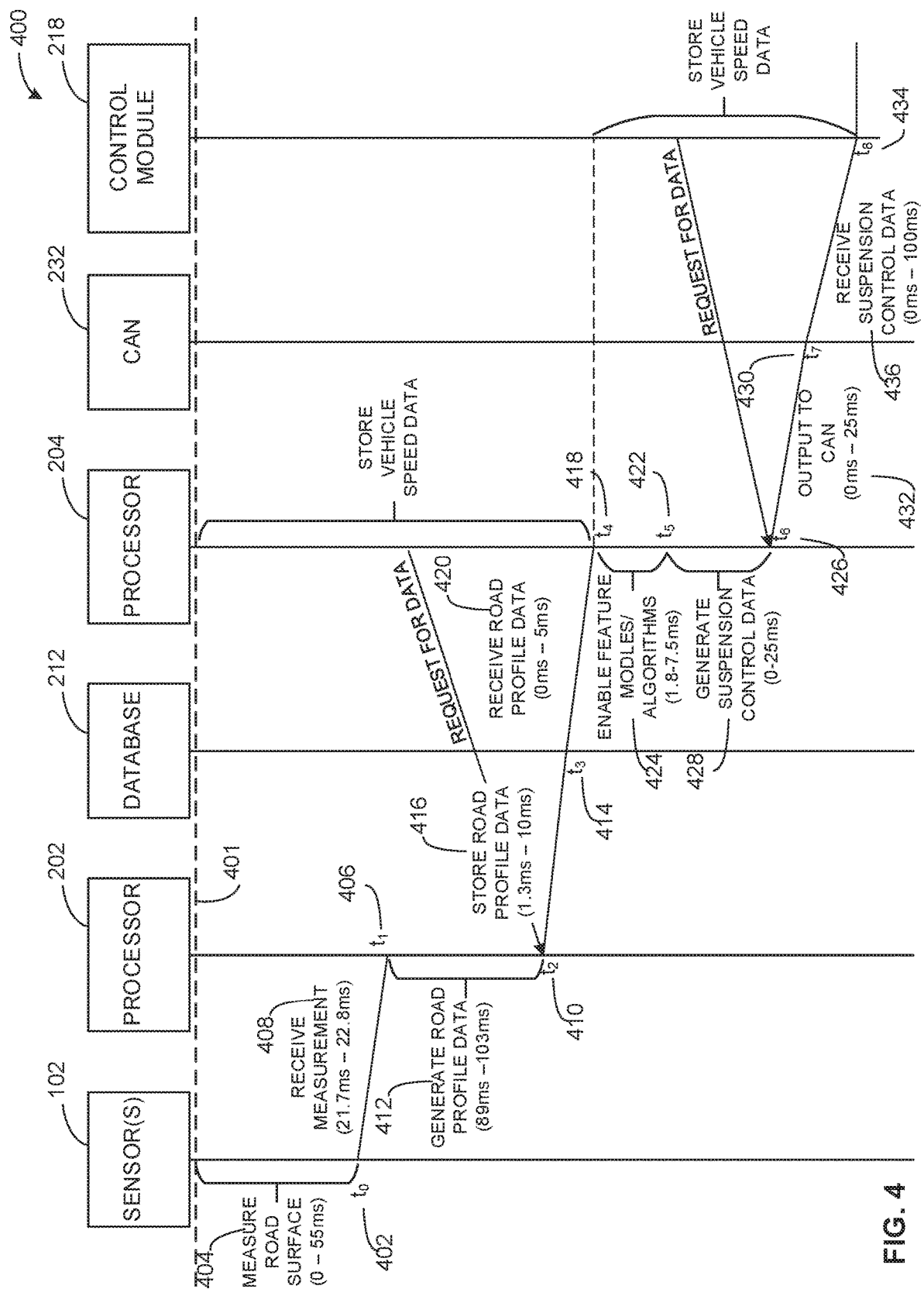
FIG. 4 is a flow diagram representing example data processing and/or transfer associated with the example suspension control system of FIG. 2.

FIG. 4 is a flow diagram 400 representative of example data processing and/or transfer between elements (e.g., the one or more sensors 102, the first processor 202, the first database 212, the second processor 204, the communication link(s) 232, the second control module 218, etc.) of the suspension control system 200 of FIG. 2. In this example, the flow diagram 400 begins at an initial time that is represented by a horizontal dotted/dashed line 401. According to the illustrated example, time advances below (in the orientation of FIG. 4) the dotted/dashed line 401 along a vertically downward direction (in the orientation of FIG. 4) of the flow diagram 400.

In some examples, the one or more sensors 102 measure the road surface 110 at time $t_0$ 402. In this example, a time interval 404 is provided by the sensor(s) 102 measuring the road surface 110. For example, the time interval 404 can be uniformly distributed between 0 milliseconds and 55 milliseconds, which may be inherent to the sensor(s) 102, as disclosed above. In other examples, such inherent behavior of the sensor(s) 102 can provide any suitable time interval 404.

In some examples, the first processor 202 receives a measurement corresponding to a parameter of the road surface 110 at time $t_1$ 406 and generates a corresponding time stamp. In this example, a time interval 408 is provided by the sensor(s) 102 transmitting the measurement to the first processor 202 via the communication link(s) 228, which is represented by $t_1-t_0$. For example, the time interval 408 can be between 21.7 milliseconds and 22.8 milliseconds.

In some examples, the first processor 202 completes generating road profile data at time $t_2$ 410 and generates a corresponding time stamp. In this example, a time interval 412 is provided by the first processor 202 generating the road profile data based on the measurement received from the sensors, which is represented by $t_2-t_1$ (e.g., different time data such as first time data and second time data). For example, the time interval 412 can be between 89 milliseconds and 103 milliseconds.

In some examples, the first database 212 receives the road profile data at time $t_3$ 414. In this example, a time interval 416 is provided by the first processor 202 storing the road profile data in the first database 212 via the communication link(s) 230, which is represented by $t_3-t_2$. For example, the time interval 416 can be between 1.3 milliseconds and 10 milliseconds.

In some examples, the second processor 204 receives the road profile data at time $t_4$ 418 and generates a corresponding time stamp. In this example, a time interval 420 is provided by the first processor 202 and/or the first database 212 transmitting the road profile data to the second processor 204 via the communication link(s) 230, which is represented by $t_4-t_3$. For example, the time interval 420 can be between 1.3 milliseconds and 15 milliseconds.

In some examples, the first database 212 stores the speed of the vehicle 100 during one or more of the time intervals 404, 408, 412, 416, 420, which enables the second processor 204 to calculate the distance 304 traveled by the vehicle 100 during the time interval(s) 404, 408, 412, 416, 420, as disclosed above.

Additionally or alternatively, the second processor 204 provides a request for data (e.g., via the synchronization module 210) to the first processor 202 during one or more of the time intervals 412, 416, 420, which can enable the second processor 204 to receive the road profile data and/or other associated data.

In some examples, the second processor 204 begins using the feature models/algorithms 208 (not shown) to generate suspension control data at time $t_5$ 422. In this example, a time interval 424 is provided by the second processor 204 triggering and/or enabling the feature models/algorithms 208 to generate suspension control data based on the road profile data, which is represented by $t_5-t_4$. For example, the time interval 424 can be between 1.8 milliseconds and 7.5 milliseconds.

In some examples, the second processor 204 completes generating the suspension control data at time $t_6$ 426. In this example, a time interval 428 is provided by the second processor 204 generating the suspension control data, which is represented by $t_6-t_5$. For example, the time interval 428 can be between 0 milliseconds and 25 milliseconds, which may depend on a rate at which the second processor 204 executes instructions.

In some examples, the communication link(s) 232 receive the suspension control data at time $t_7$ 430. In this example, a time interval 432 is provided by the second processor 204 completing generating the suspension control data and providing the suspension control data to the communication link(s) 232, which is represented by $t_7-t_6$. For example, the time interval 432 can be between 0 milliseconds and 25 milliseconds.

In some examples, the second control module 218 receives the suspension control data at time $t_8$ 434 (e.g., via the third processor 214). In this example, a time interval 436 is provided by the communication link(s) 232 receiving the suspension control data and transmitting the suspension control data to the second control module 218, which is represented by $t_8-t_7$. For example, the time interval 436 can be between 0 milliseconds and 100 milliseconds, which may depend on a rate of transmission associated with the communication link(s) 232.

In some examples, the second control module 218 stores (e.g., via the second database 216) the speed of the vehicle 100 during one or more of the time intervals 424, 428, 432, 436, which enables the second processor 204 to calculate a different distance 304 traveled by the vehicle 100 during the time interval(s) 424, 428, 432, 436, as disclosed above.

Additionally or alternatively, the second control module 218 provides a request for data (e.g., via the counter module 220) to the first processor 202 during one or more of the time intervals 424, 428, 432, 436, which can enable the second processor 204 to receive the suspension control data and/or the associated data. In this example, the second control module 218 uses the suspension control data and/or the associated data to control the suspension damper(s) 226 after the time $t_8$ 434.

As used herein, the values of the time intervals 404, 408, 412, 416, 420, 424, 428, 432, 436 illustrated in the flow diagram 400 of FIG. 4, as well as other values in this disclosure, are for illustrative purposes and other values may apply in other examples.

Figure 5:
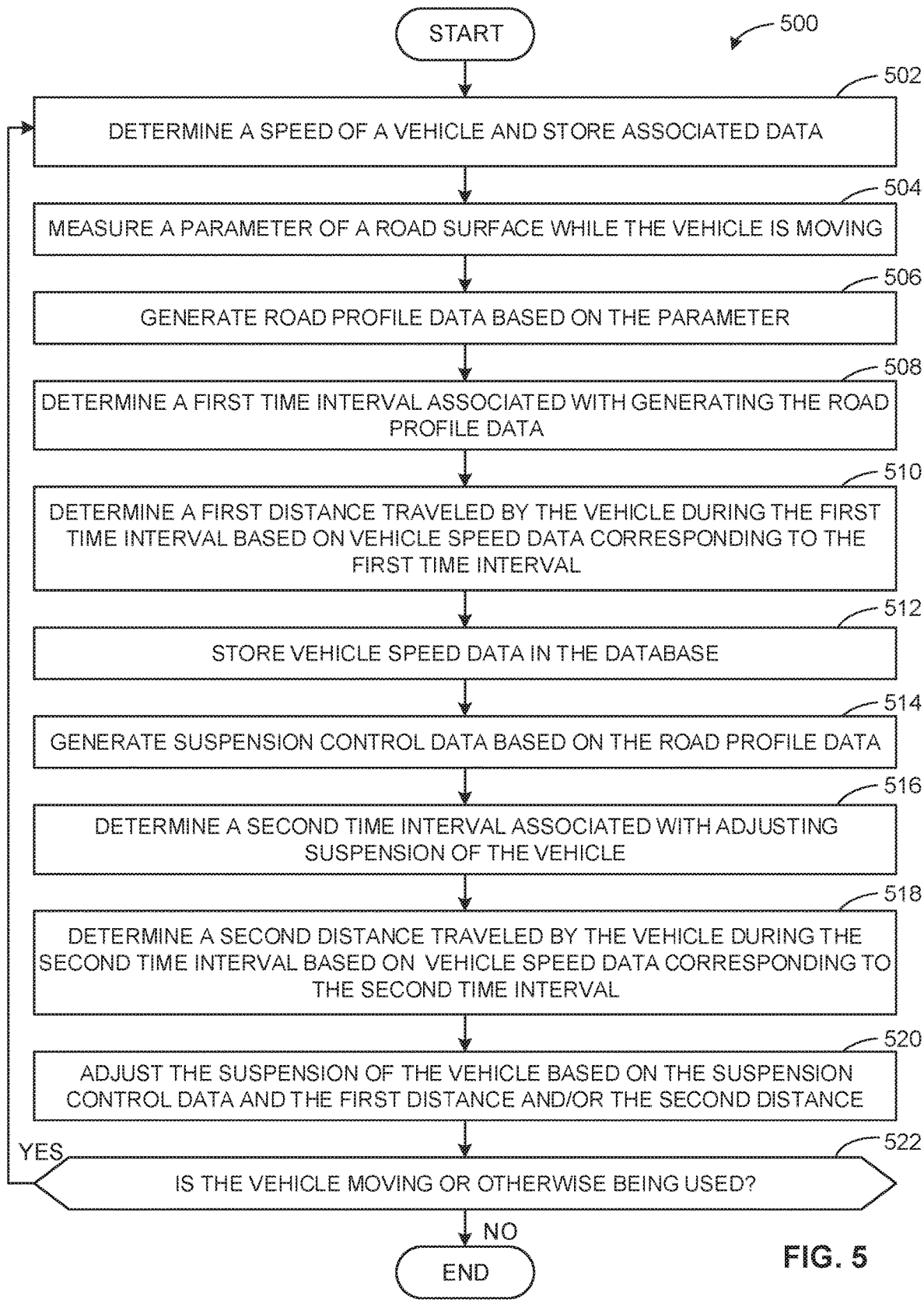
FIG. 5 is a flow diagram of an example method that may be executed to implement the example suspension control system of FIG. 2.
Figure 6:
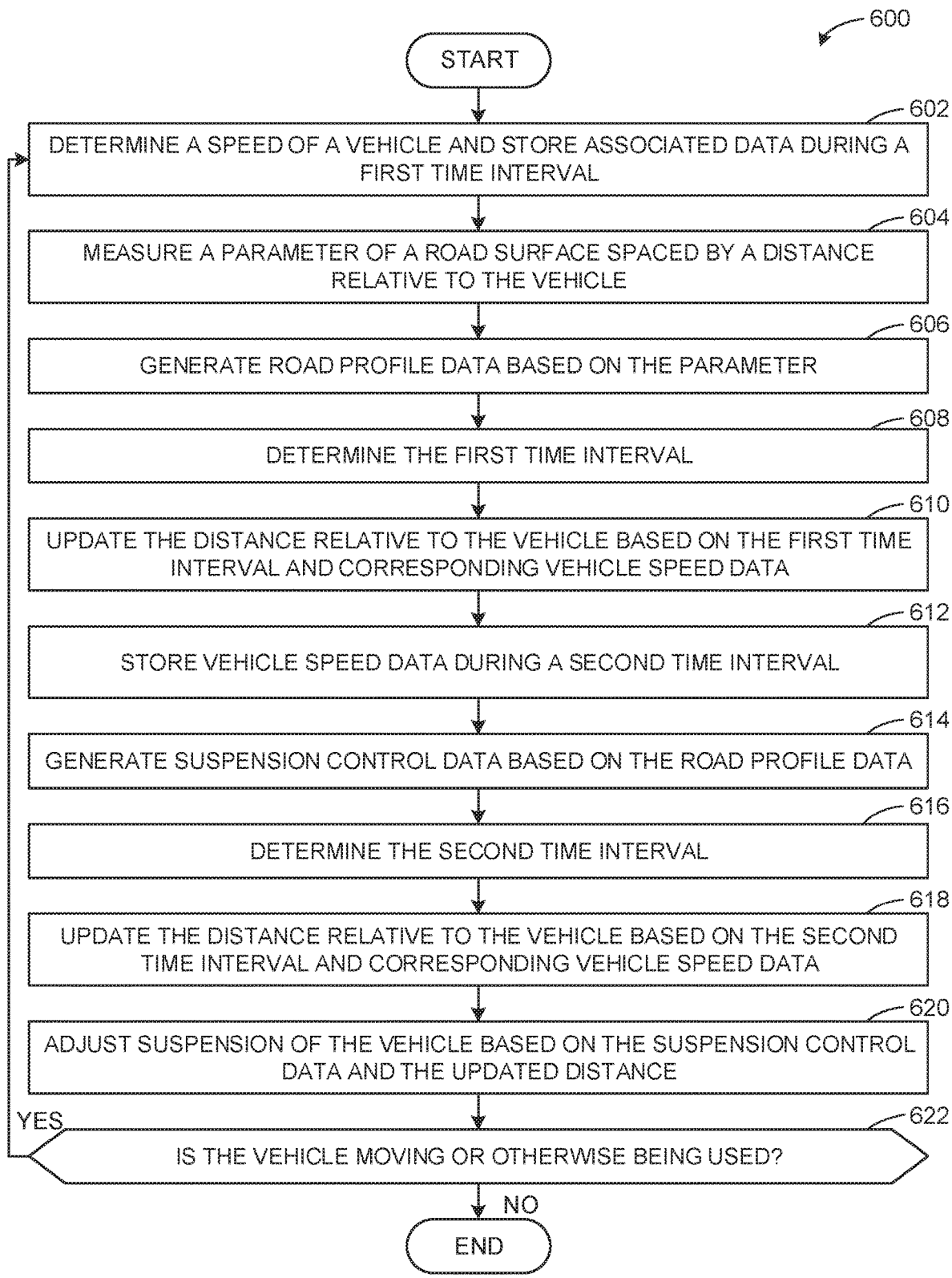
FIG. 6 is a flow diagram of another example method that may be executed to implement the example suspension control system of FIG. 2.

Flowcharts representative of example methods for implementing the example suspension control system 200 of FIG. 2 are shown in FIGS. 5 and 6. In this example, the example methods may be implemented using machine readable instructions comprising a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 5 and 6, many other methods of implementing the example suspension control system 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 5 illustrates a flowchart representative of an example method 500 that can be implemented to control and/or adjust suspension during normal vehicle use. The example method 500 can be implemented using the example vehicle 100 and/or the example suspension control system 200 shown in FIGS. 1 and 2.

The example method 500 begins with determining a speed of the vehicle 100 and storing associated data (block 502). In some examples, the one or more sensors 102 measure the speed of the vehicle 100. For example, a wheel speed sensor or tachometer continuously or repeatedly measure the speed and the suspension control system 200 determines the speed and/or stores (e.g., via the first database 212) the speed as vehicle speed data. In some examples, the first database 212 receives the vehicle speed data based on the second processor 204 executing instructions.

The example method 500 includes measuring a parameter of the road surface 110 while the 100 vehicle is moving (block 504). In some examples, the one or more sensors 102 measure a height of the road surface 110. Additionally or alternatively, the height may be spaced by the distance 302 (i.e., the preview distance) relative to the vehicle 100. For example, a camera or optical sensor repeatedly, periodically and/or aperiodically capture images of the road surface 110 corresponding to the height, which may result in time intervals between measurements in such examples.

The example method 500 includes generating road profile data based on the parameter (block 506). According to the illustrated example, the suspension control system 200 processes and/or analyzes a measurement of the height to generate a profile of the road surface 110 (i.e., road profile data). For example, the suspension control system 200 uses any suitable equation(s), algorithm(s), method(s) and/or technique(s) relating determining a profile of the road surface 110 and/or generating the road profile data. In particular, the road profile data enables the suspension control system 200 to determine how to control the suspension system 104 of the vehicle 100 via suspension control data.

The example method 500 includes determining a first time interval associated with generating the road profile data (block 508). As disclosed above, the suspension control system 200 generates different time data (e.g., time stamps). According to the illustrated example, the suspension control system 200 compares and/or otherwise processes the time data to determine the first time interval.

In some examples, the suspension control system 200 compares first time data to second time data, for example, where the first time data corresponds to the first processor 202 receiving the measured height of the road surface 110 from the one or more sensors 102 and second time data corresponds to the first processor 202 generating the road profile data based on the height.

In some examples, third time data corresponds to the first processor 202 receiving a measurement from the one or more sensors 102 and fourth time data corresponds to the second processor 204 receiving the road profile data from the first processor 202. In such examples, the first processor 202 and the second processor 204 execute instructions at the same rate (e.g., execute instructions simultaneously).

In some examples, fifth time data corresponds to the suspension control system 200 providing a request for data (e.g. from the second processor 204 to the first processor 202) and sixth time data corresponds to the suspension control system 200 receiving (e.g., at the second processor 204) the road profile data and/or other associated data (e.g., one or more time stamps, the preview distance, the vehicle speed data, etc.) in response to the request.

In other examples, suspension control system 200 compares and/or otherwise processes any other suitable time data associated with the suspension control system 200 to determine the first time interval.

Additionally or alternatively, the suspension control system 200 determines the time interval based on inherent behavior of the one or more sensors 102, which suspension control system 200 characterizes. For example, the one or more sensors 102 can include a camera or optical sensor that measures the road surface 110 repeatedly, periodically and/or aperiodically. In such examples, the suspension control system 200 uses a mean or average value of time between measurements and/or any other suitable statistic or numerical characteristic relating to the camera or optical sensor measuring the road surface 110.

The example method 500 includes determining a first distance 304 traveled by the vehicle 100 during the first time interval based on vehicle speed data corresponding to the first time interval (block 510). In some examples, the suspension control system 200 repeatedly stores the speed of the vehicle during the first time interval. In such examples, the suspension control system 200 determines first vehicle speed data, second vehicle speed data, third vehicle speed data, etc. during the first time interval such as, for example, based on the second processor 204 executing instructions. The suspension control system 200 then calculates the first distance 304 based on the first vehicle speed data, the second vehicle speed data, and time between the first vehicle speed data and the second vehicle speed data. In other examples, the suspension control system 200 uses any suitable vehicle data associated with the suspension control system 200 to calculate the first distance 304.

The example method 500 includes storing vehicle speed data (block 512). For example, the one or more sensors 102 continuously or repeatedly measure the speed and the suspension control system 200 determines the speed and/or stores (e.g., via the second database 216) corresponding vehicle speed data. In some examples, the second database 216 receives the vehicle speed data based on the third processor 214 executing instructions.

The example method 500 includes generating suspension control data based on the road profile data (block 514). According to the illustrated example, the suspension control system 200 processes and/or analyzes the road profile data to calculate the suspension control data. For example, the suspension control system 200 advantageously utilizes any suitable equation(s), algorithm(s), method(s) and/or technique(s) relating to the parameter of the road surface 110 and controlling the suspension system 104 of the vehicle 100. In particular, the suspension control data enables the suspension control system 200 to control the suspension system 104 such as, for example, by providing a control signal and/or current to the one or more suspension dampers 226 (and/or other means to adjust suspension).

The example method 500 includes determining a second time interval associated with adjusting the suspension of the vehicle 100 (block 516). According to the illustrated example, the suspension control system 200 compares and/or otherwise processes different time data to determine the second time interval. In some examples, the suspension control system 200 advantageously utilizes the second time interval to calculate a different distance 304.

In some examples, the suspension control system 200 compares seventh time data to eighth time data to determine the second time interval, for example, where the seventh time data corresponds to the suspension control system 200 providing a request for data (e.g., from the third processor 214 to the second processor 204) and the eighth time data corresponds to the suspension control system 200 receiving the suspension control data (e.g., at the third processor 214) and/or other associated data (e.g., one or more time stamps, the preview distance, the first distance 304, the vehicle speed data, etc.) in response to the request.

In other examples, suspension control system 200 compares and/or otherwise processes any other suitable time data associated with the suspension control system 200 to determine the second time interval.

The example method 500 includes determining a second distance 304 traveled by the vehicle during the second time interval based on vehicle speed data corresponding to the second time interval (block 518). In some examples, the suspension control system 200 repeatedly stores (e.g., via the second database 216) the speed of the vehicle during the second time interval. In such examples, the suspension control system 200 determines first vehicle speed data, second vehicle speed data, third vehicle speed data, etc. during the second time interval such as, for example, based on the second processor 204 executing instructions. The suspension control system 200 then calculates the second distance 304 based on the first vehicle speed data, the second vehicle speed data, and time between the first vehicle speed data and the second vehicle speed data. In other examples, the suspension control system 200 uses any suitable vehicle data associated with the suspension control system 200 to calculate the second distance 304.

The example method 500 includes adjusting the suspension of the vehicle 100 based on the suspension control data and the first distance 304 and/or the second distance 304 (block 520). According to the illustrated example, the suspension control system 200 uses the suspension control data to provide the control signal and/or the current to the one or more suspension dampers 226 (and/or other means to adjust suspension), thereby controlling the suspension system 104 and adjusting the suspension of the vehicle 100. In some examples, the suspension control system 200 provides the control signal and/or the current to each wheel assemblies 112 at specific times associated with the first distance 304, the second distance 304 and/or the preview distance.

The example method 500 includes determining whether the vehicle 100 is moving or otherwise being used (block 522). According to the illustrated example, if the suspension control system 200 determines the vehicle 100 is moving or otherwise being used (block 522), the example method 500 returns to block 502, otherwise the example method 500 ends.

FIG. 6 illustrates a flowchart representative of another example method 600 that can be implemented to control and/or adjust suspension during normal vehicle use. The example method 600 can be implemented using the example vehicle 100 and/or the example suspension control system 200 shown in FIGS. 1 and 2.

The example method 600 begins with determining a speed of the vehicle 100 and storing associated data during a first time interval (block 602). In some examples, the one or more sensors 102 measure the speed of the vehicle 100. For example, a wheel speed sensor or tachometer continuously or repeatedly measure the speed during the first time interval and the suspension control system 200 determines the speed and/or stores the speed as vehicle speed data in the first database 212. In some examples, the first database 212 receives the vehicle speed data based on the second processor 204 executing instructions.

According to the illustrated example, the first time interval is associated with the sensor(s) 102 measuring the road surface 110 and/or the suspension control system 200 generating road profile data. In some examples, suspension control system 200 advantageously utilizes the first time interval to update a distance or preview distance associated with the vehicle 100, such as the above disclosed distance 302 shown in FIG. 3A.

The example method 600 includes measuring a parameter of the road surface 110 spaced by the distance 302 relative to the vehicle 100 (block 604). In some examples, the one or more sensors 102 measure a height of the road surface 110 spaced by the distance 302 while the vehicle 100 is moving. For example, a camera or optical sensor repeatedly, periodically and/or aperiodically capture images of the road surface 110 corresponding to the height, which may result in time intervals between measurements in such examples.

The example method 600 includes generating road profile data based on the parameter (block 606). For example, the suspension control system 200 processes and/or analyzes a measurement of the height from the one or more sensors 102 to determine a profile of the road surface 110. In particular, the road profile data enables the suspension control system 200 to determine how to control the suspension system 104 of the vehicle 100.

The example method 600 includes determining the first time interval (block 608). As disclosed above, the suspension control system 200 generates different time data (e.g., time stamps). According to the illustrated example, the suspension control system 200 compares and/or otherwise processes the time data to determine the first time interval.

In some examples, the suspension control system 200 compares first time data to second time data, for example, where the first time data corresponds to the first processor 202 receiving the measured height of the road surface 110 from the one or more sensors 102 and second time data corresponds to the first processor 202 generating the road profile data based on the height.

In some examples, third time data corresponds to the first processor 202 receiving a measurement from the one or more sensors 102 and fourth time data corresponds to the second processor 204 receiving the road profile data from the first processor 202. In such examples, the first processor 202 and the second processor 204 execute instructions at the same rate (e.g., execute instructions simultaneously).

In some examples, fifth time data corresponds to the suspension control system 200 providing a request for data (e.g. from the second processor 204 to the first processor 202) and sixth time data corresponds to the suspension control system 200 receiving (e.g., at the second processor 204) the road profile data and/or associated data (e.g., one or more time stamps, the preview distance, the vehicle speed data, etc.) in response to the request.

In other examples, suspension control system 200 compares and/or otherwise processes any other suitable time data associated with the suspension control system 200 to determine the first time interval.

Additionally or alternatively, the suspension control system 200 determines the first time interval based on behavior of the one or more sensors 102. For example, as disclosed above, the one or more sensors 102 may perform repeated, periodic and/or aperiodic measurements. In such examples, the suspension control system 200 advantageously utilizes a mean or average value of time between measurements and/or any other suitable statistic or numerical characteristic relating to the measurements of the one or more sensors 102, which may be programmed to the suspension control system 200.

The example method 600 includes updating the distance 302 based on the first time interval and corresponding vehicle speed data (block 610). In some examples, the suspension control system 200 repeatedly stores (e.g., via the first database 212) the speed of the vehicle during the first time interval. In such examples, the suspension control system 200 determines a first vehicle speed data, second vehicle speed data, third vehicle speed data, etc. during the first time interval, for example, based on the second processor 204 executing instructions. The suspension control system 200 then updates the distance 302 based on the first vehicle speed data, the second vehicle speed data, and time between the first vehicle speed data and the second vehicle speed data. In other examples, the suspension control system 200 uses any suitable vehicle data associated with the suspension control system 200 to update the distance 302.

The example method 600 includes storing vehicle speed data during a second time interval (block 612). In some examples, the one or more sensors 102 continuously or repeatedly measure the speed and the suspension control system 200 determines the speed and/or stores corresponding vehicle speed data in the second database 216 during the second time interval. In some examples, the second database 216 receives the vehicle speed data based on the third processor 214 executing instructions.

According to the illustrated example, the second time interval is associated with the suspension control system 200 controlling the suspension system 104 and/or adjusting the suspension of the vehicle 100. In some examples, suspension control system 200 advantageously utilizes the second time interval to update the distance 302.

The example method 600 includes generating suspension control data based on the road profile data (block 614). According to the illustrated example, the suspension control system 200 processes and/or analyzes the road profile data to determine the suspension control data. For example, the suspension control system 200 advantageous utilizes any suitable equation(s), algorithm(s), method(s) and/or technique(s) relating to the parameter of the road surface 110 and controlling the suspension system 104 of the vehicle 100. In particular, the suspension control data enables the suspension control system 200 to control the suspension system 104, for example, by providing a control signal and/or a current to the one or more suspension dampers 226 (and/or other means to adjust suspension).

The example method 600 includes determining the second time interval (block 616). According to the illustrated example, the suspension control system 200 compares and/or otherwise processes different time data to determine the second time interval.

In some examples, the suspension control system 200 compares seventh time data to eighth time data to determine the second time interval, for example, where the seventh time data corresponds to the suspension control system 200 providing a request for data (e.g., from the third processor 214 to the second processor 204) and the eighth time data corresponds to the suspension control system 200 receiving the suspension control data (e.g., at the third processor 214) and/or associated data (e.g., one or more time stamps, the updated distance 302, the vehicle speed data, etc.) in response.

In other examples, suspension control system 200 compares and/or otherwise processes any other suitable time data associated with the suspension control system 200 to determine the second time interval.

The example method 600 includes updating the distance 302 relative to the vehicle 100 based on the second time interval and corresponding vehicle speed data (block 618). In some examples, the suspension control system 200 repeatedly stores (e.g., via the second database 216) the speed of the vehicle during the second time interval. In such examples, the suspension control system 200 determines first vehicle speed data, second vehicle speed data, third vehicle speed data, etc. during the second interval such as, for example, based on the second processor 204 executing instructions. The suspension control system 200 then updates the distance 302 based on the first vehicle speed data, the second vehicle speed data, and time between the first vehicle speed data and the second vehicle speed data. In other examples, the suspension control system 200 uses any suitable vehicle data associated with the suspension control system 200 to update the distance 302.

The example method 600 includes adjusting the suspension of the vehicle 100 based on the suspension control data and the updated distance 302 (block 620). According to the illustrated example, the suspension control system 200 uses the suspension control data to provide the control signal and/or the current to the one or more suspension dampers 226 (and/or other means to adjust suspension), thereby controlling the suspension system 104 and adjusting the suspension of the vehicle 100. In some examples, the suspension control system 200 provides the control signal and/or the current to each wheel assemblies 112 at specific times associated with the updated distance 302.

The example method 600 includes determining whether the vehicle 100 is moving or otherwise being used (block 622). According to the illustrated example, if the suspension control system 200 determines the vehicle 100 is moving or otherwise being used (block 622), the example method 600 returns to block 602, otherwise the example method 600 ends.

Figure 7:
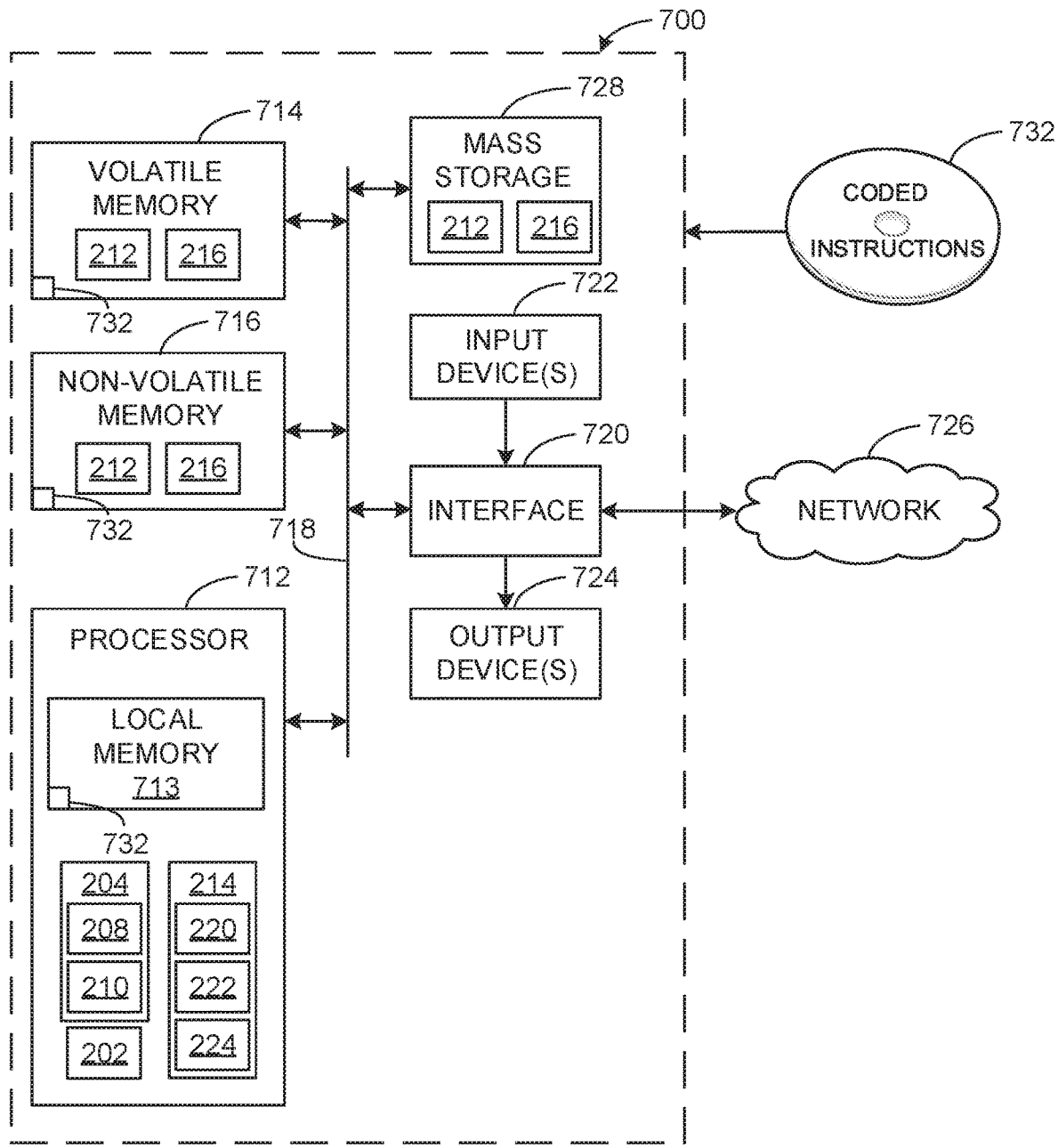
FIG. 7 is a block diagram of an example processor platform that may execute instructions to carry out the example methods of FIGS. 5 and 6 and/or, more generally, to implement the example suspension control system of FIG. 2.

FIG. 7 is a block diagram of an example processor platform 700 capable of executing instructions to implement the methods of FIGS. 5 and 6 to enable the suspension control system 200 of FIG. 2. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware processor may be a semiconductor based (e.g., silicon based) device. In this example, the processor platform 700 implements the example first processor 202, the example second processor 204, the example feature models/algorithms 208, the example synchronization module 210, the example first database 212, the example third processor 214, the example second database 216, the example second control module 218, the example counter module 220, the example time analyzer 222, the example distance calibrator 224 and/or, more generally, the example suspension control system 200.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 to implement the methods of FIGS. 5 and 6 may be stored in the mass storage device 728, in the volatile memory 714, in the non-volatile memory 716, and/or on a removable tangible computer readable storage medium such as a CD or DVD.

From the foregoing, it will be appreciated that example systems and methods have been disclosed that control a suspension of a vehicle. Examples disclosed herein determine one or more time intervals associated with controlling a suspension system (e.g., an active and/or a semi-active suspension system) of the vehicle. Additionally or alternatively, some disclosed examples determine one or more distances traveled by the vehicle during the one or more time intervals. Examples disclosed herein adjust the suspension of the vehicle based on, at least partially, a parameter of a road surface in addition to the time interval(s) and/or the distance(s) traveled by the vehicle, thereby reducing and/or eliminating vibrations and/or movement of the vehicle's chassis and disturbances which would have otherwise been experienced by occupants of the vehicle.

Although certain examples systems and methods have been disclosed herein, the scope of coverage of this patent is not limited thereto. On the contrary, this patent covers all methods, apparatus and articles of manufacture fairly falling within the scope of the claims of this patent.

What is claimed is:

1. A vehicle comprising:
   at least one of a forward-facing camera or a forward-facing optical sensor configured to measure height data of a road surface at a first time while the vehicle is traveling on the road surface, the height data being associated with a preview distance located forward of the vehicle;
   a first processor communicatively coupled to the at least one of the forward-facing camera or the forward-facing optical sensor, the first processor configured to:
      receive the height data from the at least one of the forward-facing camera or the forward-facing optical sensor at a second time subsequent to the first time while the vehicle is traveling on the road surface;
      generate road profile data at a third time subsequent to the second time while the vehicle is traveling on the road surface, the road profile data based on the received height data; and
      determine a first traversed distance traveled by the vehicle during a first time interval, the first time interval corresponding to a first processing latency extending from the first time to the third time;
   a second processor communicatively coupled to the first processor, the second processor configured to:
      transmit a road profile data request to the first processor during the first time interval;
      in response to the road profile data request, receive the road profile data from the first processor at a fourth time subsequent to the third time while the vehicle is traveling on the road surface;
      generate suspension control data at a fifth time subsequent to the fourth time while the vehicle is traveling on the road surface, the suspension control data based on the received road profile data; and
      determine a second traversed distance traveled by the vehicle during a second time interval, the second time interval corresponding to a second processing latency extending from the third time to the fifth time; and
   a third processor communicatively coupled to the second processor and communicatively coupled to a suspension damper of the vehicle, the third processor configured to:
      transmit a suspension control data request to the second processor during the second time interval;
      in response to the suspension control data request, receive the suspension control data from the second processor at a sixth time subsequent to the fifth time while the vehicle is traveling on the road surface;
      determine a third traversed distance traveled by the vehicle during a third time interval, the third time interval corresponding to a third processing latency extending from the fifth time to the sixth time; and
      adjust the suspension damper based on the received suspension control data, and further based on the preview distance compensated by the first traversed distance, the second traversed distance, and the third traversed distance.

2. A method comprising:
   measuring, via at least one of a forward-facing camera or a forward-facing optical sensor of a vehicle, height data of a road surface at a first time while the vehicle is traveling on the road surface, the height data being associated with a preview distance located forward of the vehicle;
   receiving, at a first processor of the vehicle communicatively coupled to the at least one of the forward-facing camera or the forward-facing optical sensor, the height data from the at least one of the forward-facing camera or the forward-facing optical sensor at a second time subsequent to the first time while the vehicle is traveling on the road surface;
   generating, via the first processor, road profile data at a third time subsequent to the second time while the vehicle is traveling on the road surface, the road profile data based on the received height data;
   determining, via the first processor, a first traversed distance traveled by the vehicle during a first time interval, the first time interval corresponding to a first processing latency extending from the first time to the third time;

transmitting, from a second processor of the vehicle communicatively coupled to the first processor, a road profile data request to the first processor during the first time interval;

in response to the road profile data request, receiving, at the second processor, the road profile data from the first processor at a fourth time subsequent to the third time while the vehicle is traveling on the road surface;

generating, via the second processor, suspension control data at a fifth time subsequent to the fourth time while the vehicle is traveling on the road surface, the suspension control data based on the received road profile data;

determining, via the second processor, a second traversed distance traveled by the vehicle during a second time interval, the second time interval corresponding to a second processing latency extending from the third time to the fifth time;

transmitting, from a third processor of the vehicle communicatively coupled to the second processor and communicatively coupled to a suspension damper of the vehicle, a suspension control data request to the second processor during the second time interval;

in response to the suspension control data request, receiving, at the third processor, the suspension control data from the second processor at a sixth time subsequent to the fifth time while the vehicle is traveling on the road surface;

determining, via the third processor, a third traversed distance traveled by the vehicle during a third time interval, the third time interval corresponding to a third processing latency extending from the fifth time to the sixth time; and adjusting, via the third processor, the suspension damper based on the received suspension control data, and further based on the preview distance compensated by the first traversed distance, the second traversed distance, and the third traversed distance.

3. The method of claim 2, wherein determining the first traversed distance includes:

determining a first average vehicle speed of the vehicle over the first time interval; and calculating the first traversed distance based on a product of the first average vehicle speed and a duration of the first time interval.

4. The method of claim 3, wherein determining the second traversed distance includes:

determining a second average vehicle speed of the vehicle over the second time interval; and calculating the second traversed distance based on a product of the second average vehicle speed and a duration of the second time interval.

5. The vehicle of claim 1, wherein, the first processor and the second processor are configured to execute instructions at the same rate.

6. The method of claim 4, wherein determining the third traversed distance includes:

determining a third average vehicle speed of the vehicle over the third time interval; and calculating the third traversed distance based on a product of the third average vehicle speed and a duration of the third time interval.

7. The method of claim 2, further comprising:

determining, via one of the first, second, and third processors, a fourth traversed distance traveled by the vehicle during a fourth time interval that precedes the first time interval, the fourth time interval corresponding to a fourth processing latency associated with the at least one of the forward-facing camera or the forward-facing optical sensor measuring the height data; and adjusting, via the third processor, the suspension damper based further on the fourth traversed distance.

8. A vehicle comprising:

at least one of a forward-facing camera or a forward-facing optical sensor configured to measure height data of a road surface at a first time while the vehicle is traveling on the road surface, the height data being associated with a preview distance located forward of the vehicle;

a first processor communicatively coupled to the at least one of the forward-facing camera or the forward-facing optical sensor, the first processor configured to:

receive the height data from the at least one of the forward-facing camera or the forward-facing optical sensor at a second time subsequent to the first time while the vehicle is traveling on the road surface;

generate road profile data at a third time subsequent to the second time while the vehicle is traveling on the road surface, the road profile data based on the received height data; and determine a first traversed distance traveled by the vehicle during a first time interval, the first time interval corresponding to a first processing latency extending from the first time to the third time;

a second processor communicatively coupled to the first processor, the second processor configured to:

transmit a road profile data request to the first processor during the first time interval;

in response to the road profile data request, receive the road profile data from the first processor at a fourth time subsequent to the third time while the vehicle is traveling on the road surface;

generate suspension control data at a fifth time subsequent to the fourth time while the vehicle is traveling on the road surface, the suspension control data based on the received road profile data; and determine a second traversed distance traveled by the vehicle during a second time interval, the second time interval corresponding to a second processing latency extending from the third time to the fifth time; and a third processor communicatively coupled to the second processor and communicatively coupled to a suspension damper of the vehicle, the third processor configured to:

transmit a suspension control data request to the second processor during the second time interval;

in response to the suspension control data request, receive the suspension control data from the second processor at a sixth time subsequent to the fifth time while the vehicle is traveling on the road surface;

determine a third traversed distance traveled by the vehicle during a third time interval, the third time interval corresponding to a third processing latency extending from the fifth time to the sixth time;

determine an updated preview distance by compensating the preview distance based on the first traversed distance, the second traversed distance, and the third traversed distance; and adjust the suspension based on the suspension control data, and further based on the updated preview distance.

9. The method of claim 2, wherein the vehicle further includes a control area network (CAN) bus, a first control module communicatively coupled to the CAN bus, and a second control module communicatively coupled to the CAN bus, wherein the first control module includes the first processor and the second processor, and wherein the second control module includes the third processor.

10. The vehicle of claim 8, wherein the first processor is configured to determine the first traversed distance by:
    determining a first average vehicle speed of the vehicle over the first time interval; and
    calculating the first traversed distance based on a product of the first average vehicle speed and a duration of the first time interval.

11. The vehicle of claim 10, wherein the second processor is configured to determine the second traversed distance by:
    determining a second average vehicle speed of the vehicle over the second time interval; and
    calculating the second traversed distance based on a product of the second average vehicle speed and a duration of the second time interval.

12. The vehicle of claim 8, wherein the first processor and the second processor are configured to execute instructions at the same rate.

13. The vehicle of claim 11, wherein the third processor is configured to determine the third traversed distance by:
    determining a third average vehicle speed of the vehicle over the third time interval; and
    calculating the third traversed distance based on a product of the third average vehicle speed and a duration of the third time interval.

14. The vehicle of claim 8, wherein one of the first, second, and third processors is further configured to determine a fourth traversed distance traveled by the vehicle during a fourth time interval that precedes the first time interval, the fourth time interval corresponding to a fourth processing latency associated with the at least one of the forward-facing camera or the forward-facing optical sensor measuring the height data, and wherein the third processor is further configured to determine the updated preview distance by further compensating the preview distance based on the fourth traversed distance.

15. The vehicle of claim 1, further comprising:
    a control area network (CAN) bus;
    a first control module communicatively coupled to the CAN bus, the first control module including the first processor and the second processor; and
    a second control module communicatively coupled to the CAN bus, the second control module including the third processor.

16. The vehicle of claim 8, further comprising:
    a control area network (CAN) bus;
    a first control module communicatively coupled to the CAN bus, the first control module including the first processor and the second processor; and
    a second control module communicatively coupled to the CAN bus, the second control module including the third processor.

17. The vehicle of claim 1, wherein the first processor is configured to determine the first traversed distance by:
    determining a first average vehicle speed of the vehicle over the first time interval; and
    calculating the first traversed distance based on a product of the first average vehicle speed and a duration of the first time interval.

18. The vehicle of claim 17, wherein the second processor is configured to determine the second traversed distance by:
    determining a second average vehicle speed of the vehicle over the second time interval; and
    calculating the second traversed distance based on a product of the second average vehicle speed and a duration of the second time interval.

19. The vehicle of claim 18, wherein the third processor is configured to determine the third traversed distance by:
    determining a third average vehicle speed of the vehicle over the third time interval; and
    calculating the third traversed distance based on a product of the third average vehicle speed and a duration of the third time interval.

20. The vehicle of claim 1, wherein one of the first, second, and third processors is further configured to determine a fourth traversed distance traveled by the vehicle during a fourth time interval that precedes the first time interval, the fourth time interval corresponding to a fourth processing latency associated with the at least one of the forward-facing camera or the forward-facing optical sensor measuring the height data, and wherein the third processor is further configured to adjust the suspension damper based on the fourth traversed distance.

* * * * *